June 30, 1936.　　　C. D. STROMGREN　　　2,045,882
MEANS FOR SETTING BRAKE SHOES
Filed Sept. 10, 1935

Inventor
Charles D. Stromgren
By *[signature]*
Attorney

Patented June 30, 1936

2,045,882

UNITED STATES PATENT OFFICE 2,045,882

MEANS FOR SETTING BRAKE SHOES

Charles D. Stromgren, Los Angeles, Calif.

Application September 10, 1935, Serial No. 39,903

7 Claims. (Cl. 188—79.5)

This invention has to do with effecting a predetermined, accurate and relative position of brake shoe members on their respective mountings and within the component part of the automobile brake system known as the brake drum.

It is well known that in order to produce, even or equalized braking or stopping effect through the application of friction producing members, which are interconnected through actuating means in all automobile brake systems, that it is necessary to set all rods, levers and arms at the same relative and angular positions so that each brake-shoe or friction member in each of the brake drums is made to contact with similar or equal pressure against the drums.

In order to reach this nicety of adjustment so that the stopping or braking effect at each wheel is the same, considerable time is required to set the shoes on their mounting so that they do not drag against the drum when the brakes are unapplied and at the same time have the several co-acting shoes apply with equal pressure against the drum.

Various kinds of measuring instruments, gages and tools have been made for the purpose of setting the shoes to position before mounting the drum and wheel, these are all quite expensive and require much care and skill in order to manipulate properly. Besides possible error in application, considerable time is required for mounting and demounting the gages or instruments before the drum and wheel can be permanently mounted. The permissible variation in clearances between the shoes and the drums is such as to make accurate setting with such devices almost impossible and at best an expensive method.

Most car manufacturers provide an opening in each brake drum in such position as will allow inspection of the brake shoe with respect to its position with the drum and also to permit the entrance of a feeler or thickness gage which is carelessly slipped between shoe and drum for the purpose of setting the shoe to a desired clearance position. In such cases the drum must be turned so that the inspection opening will permit inspection and gaging at each end of the several shoes which constitute the entire unit assembly of each brake. This is an adjust-and-try method and if very careful procedure is exercised an accurate setting can be obtained but it is a very slow method.

My invention provides a method and means of setting the brake shoes to their respective predetermined positions and when actuated to contact the drum they are in concentric arrangement. This result, it will be seen, can be obtained by my improved method and with the particular means which my invention provides at a nominal cost and with minimum labor requirement. Also by my improved method and the means provided it is not necessary to remove and replace the drums as is the case when a dummy or cutaway drum is used as a gaging means.

My invention in particular consists of what I may term a gage, in its preferred form, consisting of a shank adapted to fit into a corresponding hole or recess formed in the lining on the brake drum and having a flat head which rests upon the face of the lining. This gage is made of non-durable material such as fibre, wood or any soft metal such as lead and is designed preferably for use when the brake members are originally assembled or whenever the brakes are relined. The gages are made with different thickness of heads so that the gauge may be selected having the thickness corresponding to the desired clearance between the brake drum and brake shoe, it being understood that after adjustment as hereinafter described, the gage is allowed to remain in place and that the application of the brakes will immediately cause the head of the gage to wear off. Other objects and advantages will appear hereinafter from the following description and drawing.

Referring to the drawing which is for illustrative purposes only,—

Figure 1:
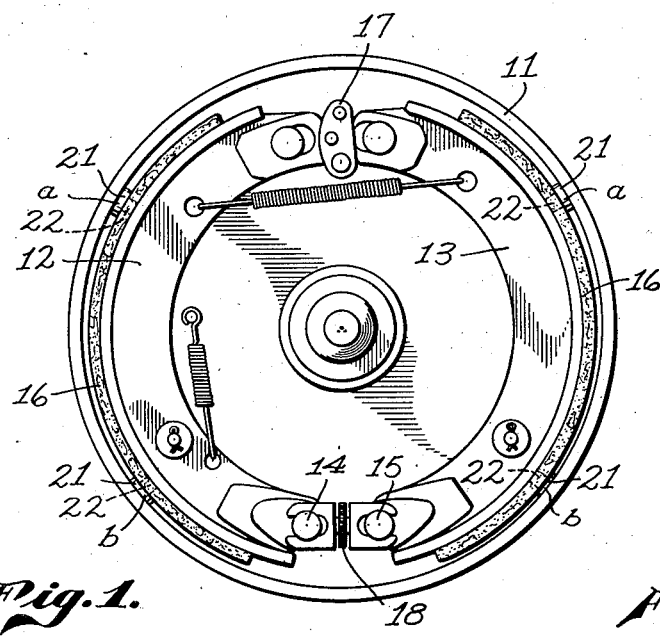
Fig. 1 is a diagrammatic side elevation of a brake assembly consisting of a brake drum, brake shoes and associated parts.

In the drawing the numeral 11 designates a brake drum and 12—13 brake shoes each pivoted at 14—15 respectively and each provided with what is ordinarily termed brake lining 16 secured to the shoes in any well known manner as by means of rivets (not shown). Illustrated diagrammatically at 17 is a cam which cooperates with the brake shoes to move the shoes into operative engagement with the brake drum and 18 designates a common form of adjustment whereby the clearance between the shoes and drum, when in inoperative position is adjusted.

In utilizing my invention a gage is used having a head of a thickness equal to the desired clearance between the brake lining and the drum and having a shank which fits into a recess or hole 20 in the brake lining, which hole or recess is formed in the lining by the manufacturer of the lining or placed therein by the mechanic at the time assembly of brake components is made.

As shown in Figs. 1 to 4 inclusive, the gage consists of a round head 21 and a round shank 22. These gages are placed on the lining by inserting the shank into the hole in the brake lining with the underside of the head resting on the face of the lining and when in place the adjustment of the brake shoes made, in the form illustrated by the adjustment 18 by moving the brake shoes outwardly until the heads 21 of the gages are clamped firmly between the brake shoe and the brake lining. By using a nondurable material for the gages the heads wear off so that after several applications of the brake when in service the heads are entirely worn off and concentric engagement of the brake lining with the drum is assured.

In the form of brake shown in Fig. 1 it is noted that the brake shoes at the cam end swing a greater distance than at the pivotal end, consequently the clearance at the cam end is greater when in inoperative position than at the pivotal end. It is therefore apparent that the heads of the gages used at the cam end of the shoes are thicker than those at or near the pivotal end as shown at "a" and "b" respectively in Fig. 1.

Figure 2:
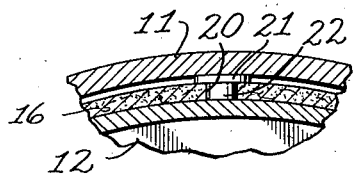
Fig. 2 is a fragmentary sectional view of a portion of a brake drum, brake shoe and lining showing a device embodying the preferred form of my invention as applied thereto. The parts being shown in adjusted position.

In Fig. 2 is illustrated a gage of the type above described showing the position of the gage when mounted on the brake lining and as the parts are related to each other when the shoe is placed within the drum. As stated above when the parts are in such position the shoes are adjusted by the ordinary adjustment mechanism so that the head of the gage is in engagement with the drum and the face of the brake lining which indicates that the brake lining is properly spaced from the brake drum, it being understood that the gage has been selected which has a thickness equal to the amount of clearance between the brake drum and the lining.

Figure 3:
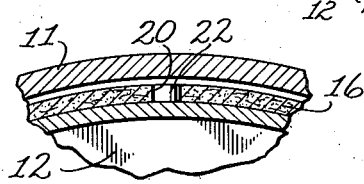
Fig. 3 is a view similar to Fig. 2 showing the gage after the brake has been used.
Figure 4:
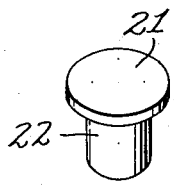
Fig. 4 is a perspective view of the gage illustrating the preferred form of my invention.

The gage is made of what I have termed nondurable material as the gages are left assembled in the parts as above described and the head of the gage almost immediately worn off upon application of the brakes, whereupon the gage has the appearance as shown in Fig. 3. It will be seen that this operation, just described, provides a simple and efficient way of accurately spacing the contacting parts of the brake as distinguished from the ordinary methods now in use and assures that the brakes on each wheel of the vehicle are correctly adjusted insofar as the brake itself is concerned.

Figure 5:
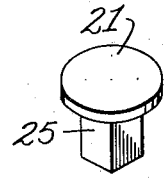
Figure 6:
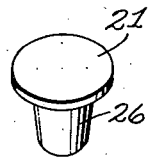

In the form shown in Fig. 5 the gage only differs from that previously described by having a square shank as shown at 25. In the form shown in Fig. 6 the shank is tapered as indicated at 26, and in the form shown in Fig. 7 the shank is threaded as indicated at 27 so that the shank may be threaded into the material of the brake lining, this form having a screw driver slot as indicated at 28.

Figure 8:
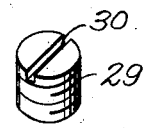
Figure 9:
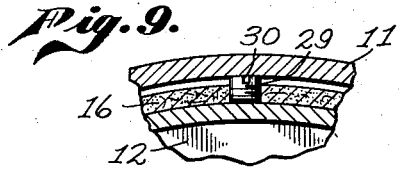
Fig. 9 shows a fragmentary sectional view illustrating the application of the form shown in Fig. 8 to the brake lining on a brake shoe.

In the form shown in Figs. 8 and 9 the head of the gage is omitted and the gage in this form consists of a threaded plug 29 having a screw driver slot 30 in the top. When using the form of gage as shown in Figs. 8 and 9, it will be understood that the plug is threaded into the lining as shown in Fig. 9 until the head extends beyond the face of the lining a distance equal to the clearance desired when the brake is in inoperative position.

Figure 10:
Fig. 10 shows a further modified form of the gage, and—

In the form of gage illustrated in Fig. 10 the gage consists of a flat head 31 having formed thereon a spike 32. In this form of gage it will be understood that the gage is mounted on the lining by pressing the spike into the lining until the flat head engages the face of the lining.

While I have described my invention as consisting of a gage of nondurable material and while this form of gage has the advantage that after having once been mounted on the lining that it is not necessary to again remove the brake shoes from the drum, I do not desire to limit my invention to a gage of the class described in which the gage is made of nondurable material but wish to include also gages of the different forms above described, which may be made of steel or any other durable material which gages would be used in the same manner as those described above with the qualification, however, that after the brake shoes had been properly set it would be necessary to remove the shoes so that the gages could be removed.

Figure 7:
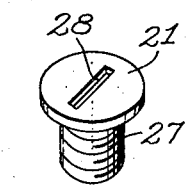
Figs. 5, 6, 7 and 8 are perspective views showing modified forms of the gage.
Figure 11:
Fig. 11 shows a further modification with a threaded opening in the shoe to receive the threaded shank of the gage.

In the form shown in Fig. 11 the brake shoe 12 is provided with a threaded opening 35, so that, if desired, a gage like that shown in Fig. 7 may be used with the threaded shank 27 extending into threaded engagement with the threaded opening in the brake shoe.

I claim as my invention:

1. In combination with a brake shoe lining having a recess therein; a gage of nondurable material consisting of a flat head on the outer face of the lining and a shank on said head extending into the recess in said lining.

2. A device for setting brake shoes having brake lining thereon with proper clearance from the brake drum comprising a gage of nondurable material having a temporary head engaging the outer face of the lining and a shank extending into a hole in the lining.

3. A device for setting brake shoes having brake lining thereon with proper clearance from the brake drum comprising a gage of nondurable material having a temporary head engaging the outer face of the lining and a shank extending into a hole in the lining, said head being of a thickness equal to the predetermined clearance between the brake lining on the brake shoe and the drum when in inoperative position.

4. A device for setting brake shoes, having brake lining thereon, with proper clearance from the brake drum comprising a gage of nondurable material consisting of a flat member seated on the face of the lining and means engageable with the lining for retaining said flat member at a predetermined location on the lining, said means consisting of a projection on the head extending into the lining.

5. In combination with a brake drum and brake shoe having lining thereon with a recess in the lining, a gage of nondurable material seated in the recess and extending outwardly beyond the face of the lining a distance equal to the desired clearance between the face of the lining and the brake drum when the brake shoe is in inoperative position.

6. In combination with a brake drum and brake shoe having lining thereon with a recess in the lining, a gage of nondurable material seated in the recess and extending outwardly beyond the face of the lining a distance equal to the desired clearance between the face of the lining and the brake drum when the brake shoe is in inoperative position, said gage having threads thereon for adjusting the extension of the gage from the face of the lining.

7. For use in combination with brake members, a gage for setting the members with proper clearance which consists of a shank member having a head portion, the head portion having a thickness substantially equal to the desired clearance.

CHARLES D. STROMGREN.